United States Patent [19]

Morby et al.

[11] Patent Number: 4,752,233

[45] Date of Patent: Jun. 21, 1988

[54] ELECTRIC POWER PANELBOARD ADAPTER MODULE

[75] Inventors: John A. Morby, Farmington; Robert J. Sabatella, Southington; Richard A. Cornish, Bristol; Robert L. Owens, Southington, all of Conn.

[73] Assignee: General Electric Company, New York, N.Y.

[21] Appl. No.: 75,801

[22] Filed: Jul. 20, 1987

[51] Int. Cl.$^4$ ............................................. H01R 25/14
[52] U.S. Cl. ...................................... 439/212; 361/353
[58] Field of Search ............... 361/353, 354, 355, 358, 361/361; 439/212, 213, 114

[56] References Cited

U.S. PATENT DOCUMENTS

| | | | |
|---|---|---|---|
| 3,354,357 | 11/1967 | Jorgensen et al. | 361/361 |
| 3,619,727 | 11/1971 | Hackenbroch | 361/361 |
| 3,743,891 | 7/1973 | Buxton | 361/353 |
| 3,787,712 | 1/1974 | Diersing | 439/213 |
| 3,831,120 | 8/1974 | Powell et al. | 335/176 |
| 3,840,717 | 10/1974 | Pekrul et al. | 200/284 |
| 3,842,322 | 10/1974 | Leonard | 361/376 |

FOREIGN PATENT DOCUMENTS 0916765  1/1963  United Kingdom ............... 439/212

Primary Examiner—Gil Weidenfeld
Assistant Examiner—Gary F. Paumen
Attorney, Agent, or Firm—Richard A. Menelly; Walter C. Bernkopf; Fred Jacob

[57] ABSTRACT

An adapter module allows circuit breakers and disconnect switches of varying ratings to be installed within a common power panel enclosure. The adapter consists of a plastic base member through which multiple contact jaws extend for plugging onto the individual phase buses of a multi-phase power system. The opposite ends of the jaws include means for connecting with the line terminal of both the electric circuit breakers as well as the electric disconnect switches.

13 Claims, 4 Drawing Sheets

ELECTRIC POWER PANELBOARD ADAPTER MODULE

BACKGROUND OF THE INVENTION

This invention relates to a circuit breaker and disconnect switch support member having means for attaching bolt-on electric circuit breakers such as described within U.S. Pat. No. 3,831,120 entitled "Trip Unit Having Improved Trip Adjustment Indicator and Circuit Breaker Incorporating Same". The so-called "bolt-on" circuit breakers cover a wide range of circuit breaker ampere ratings. Since the physical dimensions of the circuit breakers generally increase with increased circuit breaker ratings, the enclosure dimensions are customized to accommodate specific circuit breaker dimensions. Industrial electrical panelboards consequently must be fabricated and the circuit breakers installed at the factory site. One attempt to facilitate the accommodation of a wide range of molded case circuit breaker ratings is to attach a plastic base having plug-on jaws already attached thereto and bolting the circuit breakers directly to the base. The base is then installed within the custom panelboard by plugging the jaws directly onto the bus conductors located within the electric panelboard interior. Examples of such adapters are found in the following U.S. Pat. Nos. 3,354,357; 3,619,727; 3,787,712 and 3,842,322.

In order to facilitate on-site installation of electric panelboards, it is less time-consuming to order an electric panelboard from a supplier and directly connect the bolt-on circuit breakers at the construction site. The panelboard, accordingly, would have to accommodate a wide range of bolt-on type molded case circuit breakers without substantial modification of the panel-board interior. One purpose of the instant invention is to provide means for connecting such a wide range of circuit breakers within a panelboard interior at the site of intended use resulting in a substantial savings in both material costs and a substantial decrease in delivery time.

SUMMARY OF THE INVENTION

A plastic bolt-on circuit breaker and disconnect switch support includes three separate plug-on jaws arranged for connecting with the individual phases of a multi-phase power system. A wide range of bolt-on circuit breakers and electric disconnect switches are bolted onto the plastic adapter which adapter is in turn plugged onto the bus bar conductors arranged within a standard electric panelboard interior.

DESCRIPTION OF THE PREFFERED EMBODIMENT

Figure 1:
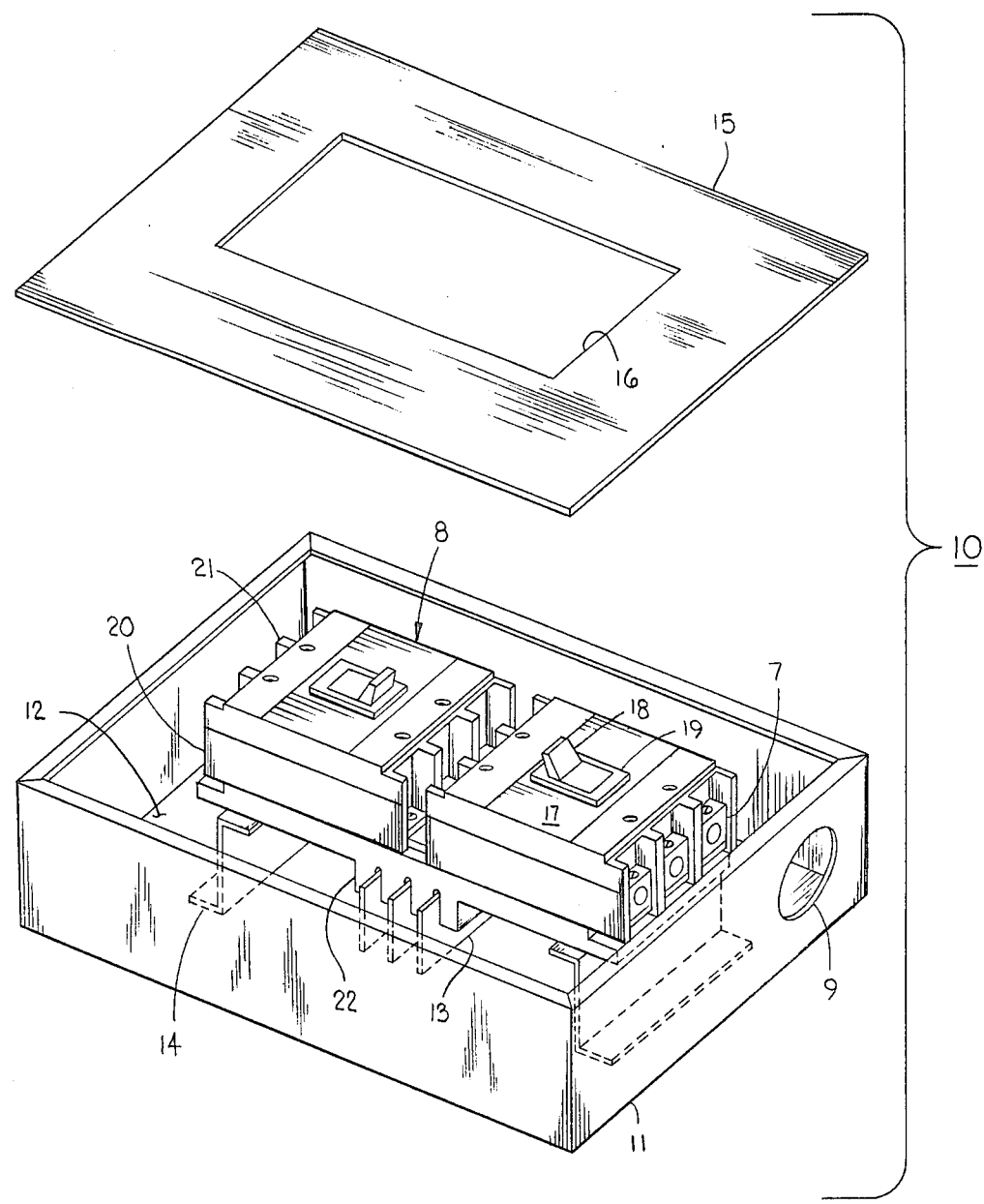
FIG. 1 is a top perspective view of an electric power panelboard with the face plate in isometric projection.

A power panelboard 10 is shown in FIG. 1 to consist of a 4-sided enclosure 11 joined by a bottom 12. The power panelboard interior generally shown at 8 includes three power bus conductors 13 arranged perpendicular to the bottom and are electrically connected with each phase of a three-phase power system. A pair of support side rails 14 position and support the power panelboard adapter module 22 which in turn supports a pair of plug-on type circuit breakers 17 or a plug-on circuit breaker in combination with a fused disconnect switch. The fused disconnect switch is similar to that described within U.S. Pat. No. 3,840,717 entitled "Manually Operated Rotary Switch and Combination Load Contact-Fuse Clip Therefor" which patent is incorporated herein for purposes of reference. The plug-on circuit breaker 17 includes a case 20 and a cover 21 through which an operating handle 18 protrudes. Both the escutcheon 19 formed on the cover and the operating handle 18 protrude through the aperture 16 formed within the panelboard face plate 15 when the face plate is attached to the side enclosure 11. Electrical access to the circuit breaker load lugs 7 is made by means of the wiring access hole 9 through the side enclosure 11.

Figure 2:
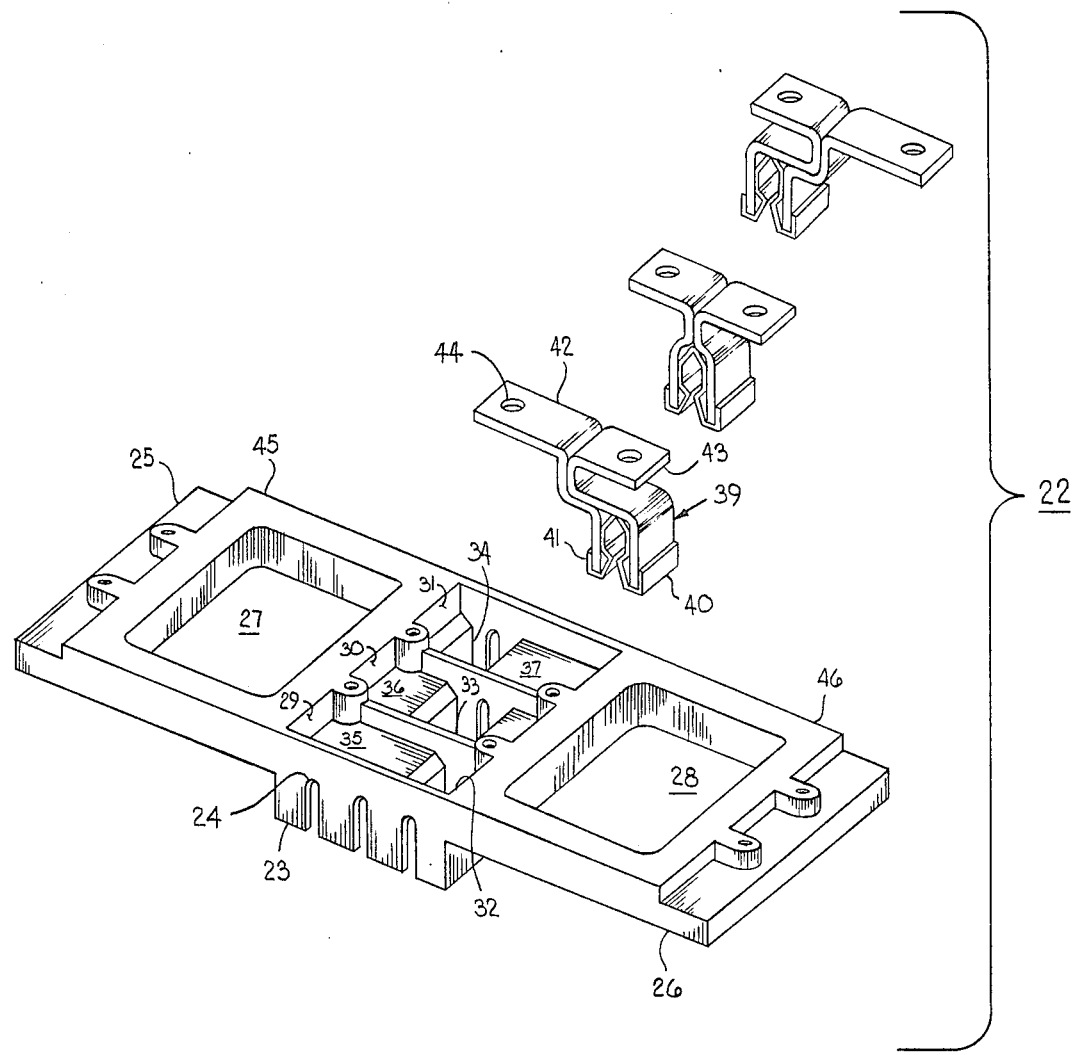
FIG. 2 is a top perspective of the adapter module of the invention within the power panelboard of FIG. 1 with the plug-on jaws in isometric projection.

The assembly of the adapter module 22 is best seen by referring now to FIG. 2 wherein a central base 23 formed from a plastic resin such as Noryl, which is a trademark of General Electric Company for a modified polyphenylene oxide. The central base 23 includes three parallel and elongated grooves 24 formed in the bottom thereof to accommodate the power bus conductors 13 shown earlier in FIG. 1. The adapter includes apertured extensions 25 and 26 integrally formed with the central base and through which extend corresponding apertures 27, 28 for enhancing convection cooling of the bolt-on circuit breakers or disconnect switches when attached thereto. The apertured extensions 25, 26 include perimetric platforms 45, 46 extending therefrom in order to provide adequate support to the bolt-on circuit breakers or fused disconnect switches. Three corresponding recesses 29–31 are formed within the central base 23 and define corresponding recess bottoms 35–37 along with corresponding slots 32–34. The plug-on jaws 39 are inserted within each of the slots 32–34 such that the blades 40, 41 extend down within the slots while the apertured plates 42, 43 rest on and are supported by the corresponding bottoms 35–37. A pair of threaded openings 44 are provided within the apertured plates 42, 43 for attachment to the bolt-on circuit breakers and fused disconnect switches when attached thereto.

Figure 3:
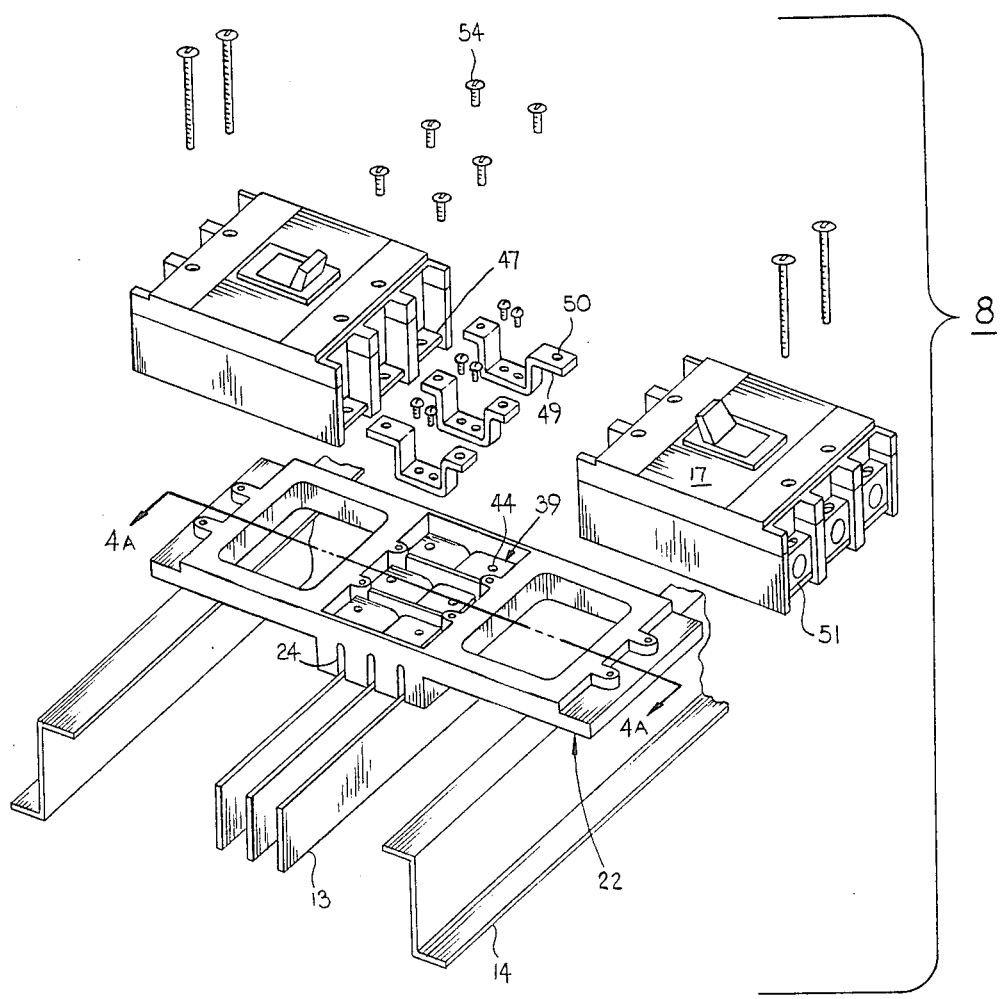
FIG. 3 is a top perspective view of the power panelboard interior with the bolt-on circuit breakers in isometric projection.

The panelboard interior 8 shown earlier in FIG. 1 is now depicted in FIG. 3 with the plug-on circuit breakers 17 shown prior to electrical connection therewith. The adapter module 22 is arranged over the support rails 14 and the power bus conductors 13 are located within the adapter module grooves 24. Corresponding wing-shaped branch straps 49 are next fastened to the threaded apertures 44 formed within the plug-on jaws 39 and the circuit breaker line straps 47 are attached to the branch straps by means of bolts 54 and threaded holes 50 formed through the branch straps. When the plug-on circuit breakers are attached to the adapter module, electrical connection with the protected equipment is made with the plug-on circuit breakers by means of the load lugs 51.

Figure 4A:
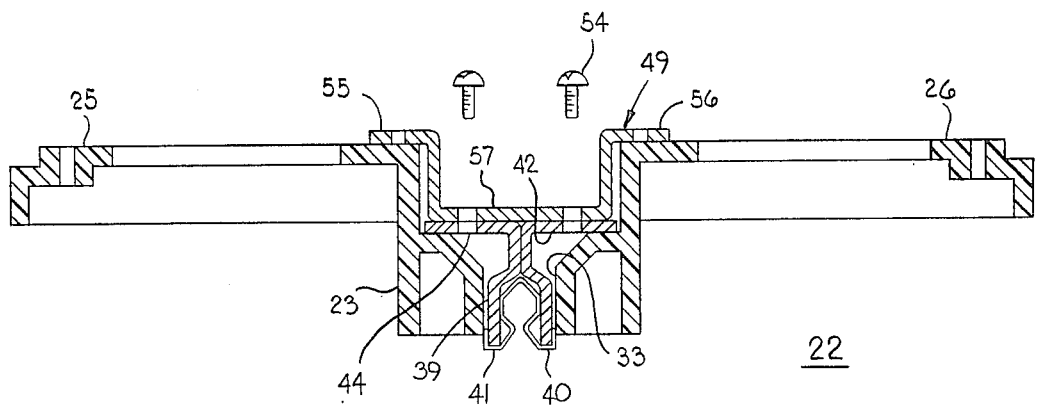
FIGS. 4A and 4B are side sectional views of two separate embodiments of the adapter module according to the invention.
Figure 4B:
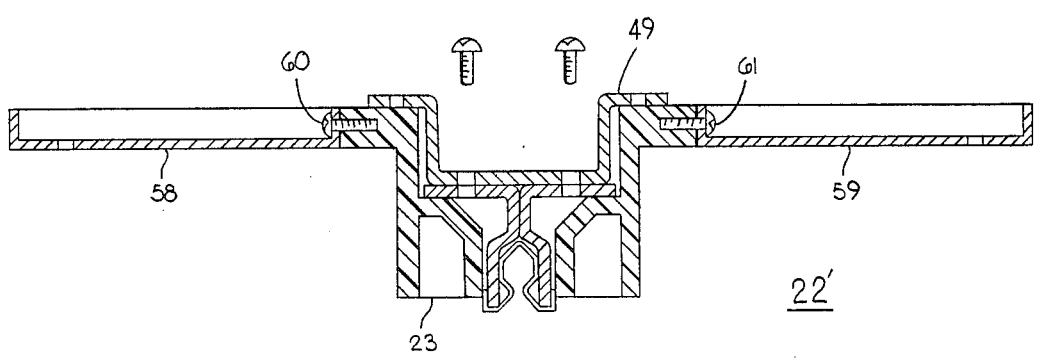

The attachment between the branch straps 49 and the adapter module 22 of FIG. 3 is best seen by referring now to FIGS. 4A and 4B. The jaw blades 40, 41 of plug-on jaw 39 project down through the bottom of the adapter module base 23 for connection with the power bus conductors while the apertured plate 42 of the plug-on jaw extends within the central slot 33 for receiving the bolt 54 that attaches the branch straps 49 to the apertured plate 42 by means of the threaded apertures 44. A bight 57 which connects the branch strap arms 55, 56 extends slightly within the slot 33 while the arms seat on the adapter module apertured extensions 25, 26 for additional support. The adapter module 22' depicted in FIG. 4B is similar to that shown in FIG. 4A with the apertured extensions 25, 26 replaced by metal plates 58 and 59 which are secured to the adapter module central base 23 by means of screws 60, 61 as indicated.

Having thus described our invention, what we claim as new and desire to secure by Letters Patent is:

1. An electric power panelboard comprising:
   a support base;
   three electric bus conductors arranged edgewise along said base;
   a slotted and molded circuit breaker and disconnect switch insulative support electrically connected with said bus conductors on a bottom of said support and electrically and detachably connected with at least one circuit breaker or disconnect switch on a top surface thereof, said electric bus conductors being arranged parallel to each other within elongated slots formed within said insulative support.

2. The electric power panelboard of claim 1 wherein said insulative support comprises a central body member having a pair of extending side members, said elongated slots being formed within said central body member.

3. The electric power panelboard of claim 2 further including three recesses formed within said top surface of said central body member and three plug-on connectors arranged within said recesses, each of said plug-on connectors being electrically connected with one of said bus conductors.

4. The electric power panelboard of claim 3 wherein each of said plug-on connectors comprise a pair of planar apertured surfaces at one end whereby each said circuit breaker or disconnect switch is bolted to one of said plug-on connectors, and further comprising a pair of jaws at an opposite end whereby said bus conductors are trapped within said jaws to electrically connect said circuit breaker or disconnect switch with said bus conductors.

5. The electric power panelboard of claim 4 further including support platforms integrally formed within each of said recesses, whereby each of planar apertured surfaces sits on one of said platforms.

6. The electric power panelboard of claim 3 further including an access slot formed through each of said platforms whereby each of said pair of jaws extend down through each of said access slots.

7. The electric power panelboard of claim 2 including a pair of support plates arranged edgewise on said bottom, one under each of said side members.

8. The electric power panelboard of claim 7 wherein said support plates are parallel to said electric bus conductors.

9. An adapter module for connecting an electric circuit breaker or disconnect switch to bus conductors, comprising:
   a plastic central body member arranged intermediate a pair of outer side members;
   three parallel recesses formed within said central body member, each of said recesses defining a platform and an access slot; and
   three plug-on connectors, each of said connectors being arranged within a corresponding one of said recesses, said connectors each comprising a top apertured planar surface and a pair of jaws depending from said planar surface, each of said planar surfaces being supported by and in contact with a corresponding one of said platforms, said jaws and said access slots being adapted to receiver said bus conductors at a bottom surface of said body member.

10. The adapter module of claim 9 wherein each of said jaws extends through a corresponding one of said access slots.

11. The adapter module of claim 9 wherein each of said planar surfaces includes threaded apertures.

12. The adapter module of claim 9 wherein each of said side members is integrally formed with said central member.

13. The adapter of claim 9 wherein said side members comprise a pair of metal plates bolted to either side of said central member.

* * * * *